(No Model.) 2 Sheets—Sheet 2.

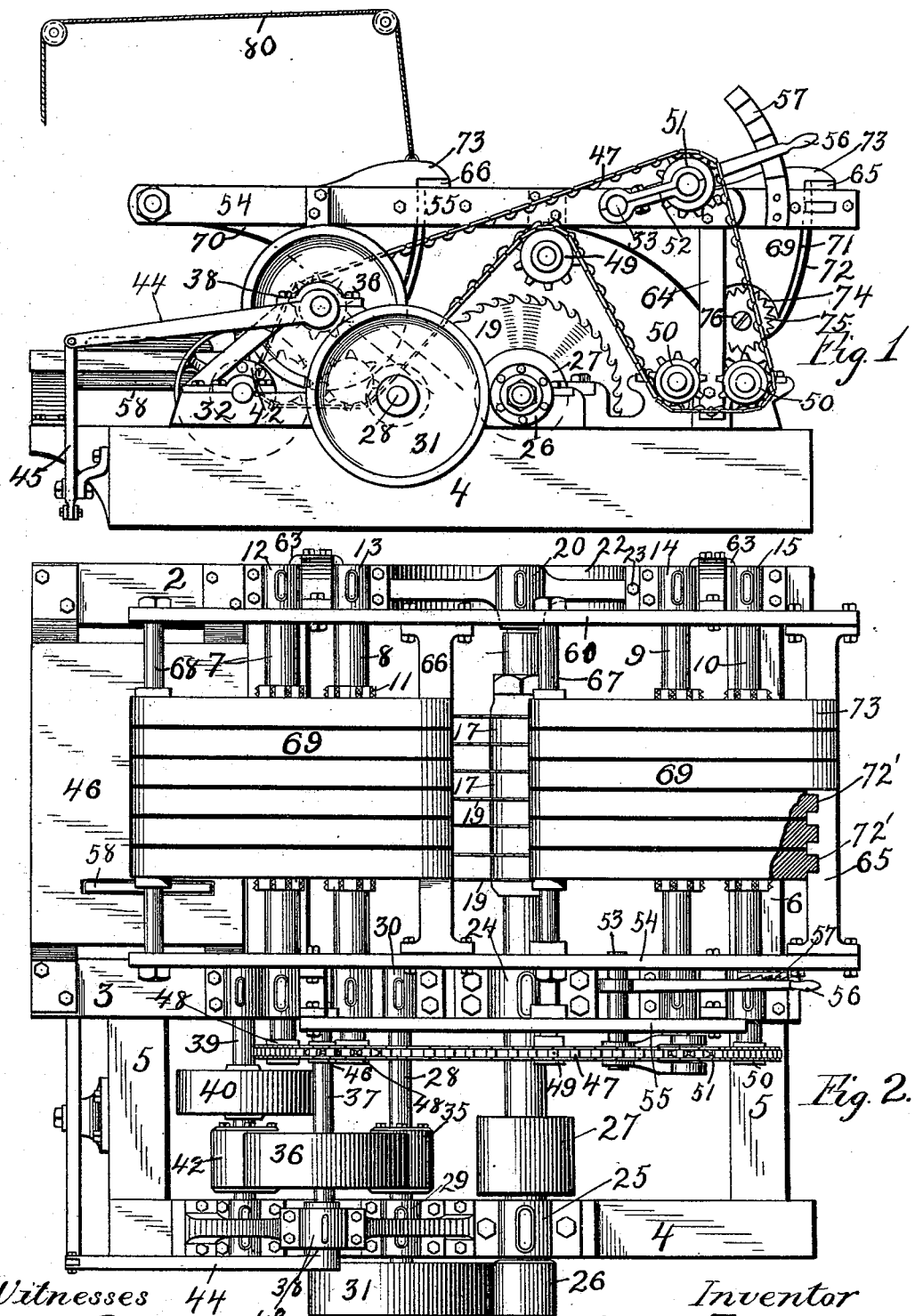

H. JONCAS.
LATH BOLTER.

No. 514,081. Patented Feb. 6, 1894.

Witnesses
G. E. Purple
F. S. Lyon

Inventor
Henry Joncas.
By Paul A. Merwin Attys.

UNITED STATES PATENT OFFICE.

HENRY JONCAS, OF MINNEAPOLIS, MINNESOTA, ASSIGNOR, BY MESNE ASSIGNMENTS, OF ONE-FOURTH TO THE GEMLO IRON WORKS COMPANY, OF SAME PLACE.

LATH-BOLTER.

SPECIFICATION forming part of Letters Patent No. 514,081, dated February 6, 1894.

Application filed December 6, 1892. Serial No. 454,281. (No model.)

*To all whom it may concern:*

Be it known that I, HENRY JONCAS, of Minneapolis, in the county of Hennepin and State of Minnesota, have invented certain Improvements in Lath-Bolters, of which the following is a specification.

My invention relates to means for preparing lath bolts from slabs, these lath bolts to be afterward sawed in the lath machine.

The object of the invention is to provide a lath bolter which will be simple and economical in construction, which will do perfect work and which may be safely handled by any person, all possibility of injury to the operator being done away with.

To this end the invention consists in the combination with a feed table, of feed rolls, a series of equidistantly arranged saws, and a series of drops arranged above the feed rolls and operating so close together as to effectually prevent slivers from getting between them; and the invention consists further in the construction and combinations all as hereinafter described and particularly pointed out in the claims, and will be more readily understood by reference to the accompanying drawings, in which—

Figure 3:
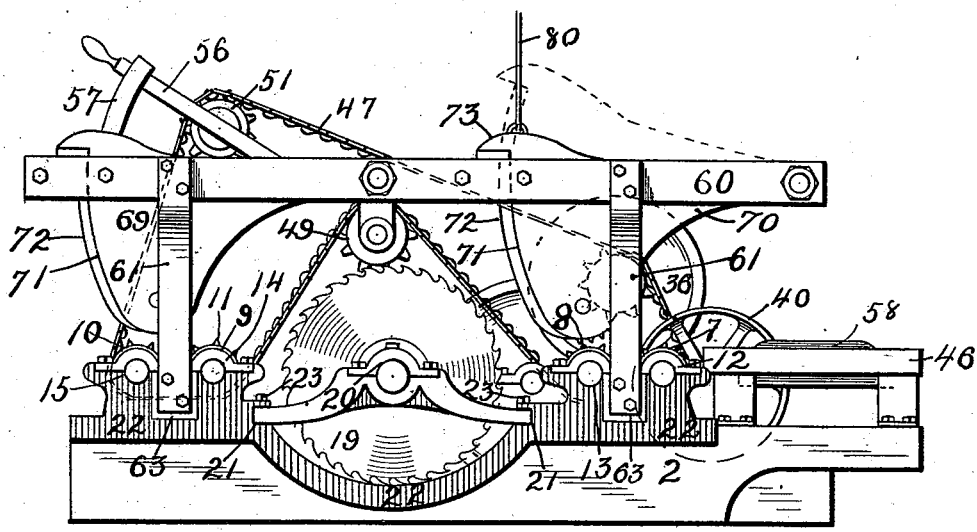
Figure 6:
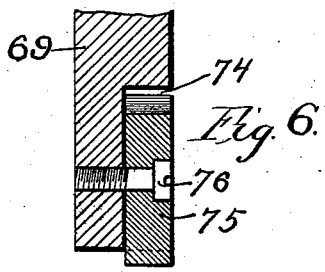
Figure 5:
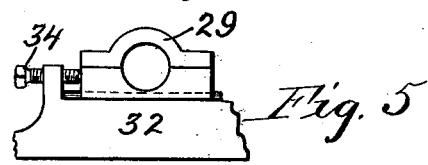
Figure 4:
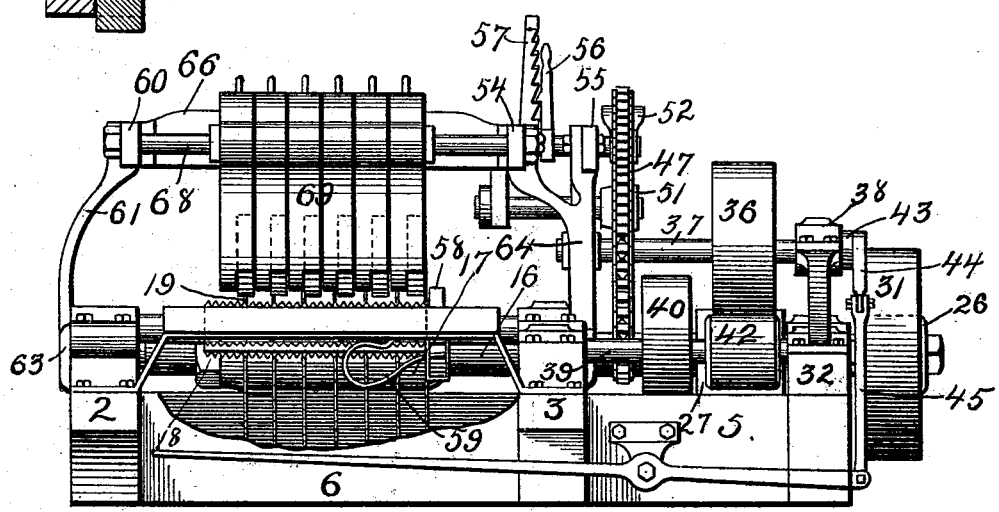

Figure 1 is a side view of a machine embodying my invention. Fig. 2 is a plan view thereof. Fig. 3 is a view of the opposite side of the machine. Fig. 4 is a front elevation of the machine, a portion of the frame being broken away to show the saws. Fig. 5 is a detail view of the adjustable bearing or box for the shaft 28. Fig. 6 is an enlarged vertical cross section of the lower end of one of the heavy weights or arms.

As shown in the drawings, I provide a heavy wooden base upon which to rest the metal parts of the machine, and consisting in the side beams 2 and 3 and the outlying beam 4, which latter is connected with the beam 3 by the short cross pieces 5. The heavy cross pieces 6 connect the side beams thus forming a very strong base.

7—8 and 9—10 represent the pairs of feed or carrying rolls having the rows of teeth 11 to engage the slabs and arranged upon the shafts having bearings in the boxes 12, 13, 14 and 15 respectively. Between the pairs of carrying rolls I arrange the saw arbor 16, having the several collars 17 and the usual lock nuts 18, and carrying the circuitous saws 19 arranged at equal distances from one another, the space between them being the width of a lath. The arbor shaft extends across the whole base, being supported at one end in the yoke bearing 20, the ends of which are secured in the notches 21 of the metal box piece 22, being secured therein by set screws 23. This piece 22, as shown in Fig. 3, is curved downwardly so that upon the removal of the yoke the saws may all be slipped off of the arbor without changing the elevation of the shaft. The lower parts of the boxes 12, 13, 14 and 15 are all included in the single casting 22. The boxes for the opposite ends of the arbor and roll shafts are all made in a similar single casting and in manufacture the two parts are, together with the upper boxes, attached and bored out, thus bringing the boxes into exact line when the machine is erected and preventing any possible displacement of one shaft with respect to the other, as well as greatly lessening the cost of the machine. Passing through the intermediate box 24 the arbor shaft extends into the bearing 25 on the beam 4, and upon its outer end is provided with the paper friction pulley 26. On the inner part of the shaft I arrange the main drive belt pulley 27. On the short shaft 28 arranged in bearings 29 and 30 I provide the large friction wheel 31 adapted to engage the paper friction pulley 26. The box 29 is slidably arranged upon the long casting 32 in which are the lower boxes of the several bearings, and the box 29 is adjusted by means of the set screw 34, as shown in Fig. 5. The pulley 31 may thus be held against the small pulley 26. Upon the inner part of the shaft 28 I arrange the paper friction pulley 35 with which the drive pulley 36 is adapted to engage. This drive pulley is provided on the short shaft 37 supported in the raised boxes 38, the outer one of which is arranged in the form of a bracket fastened upon the casting 32. Beneath the other side of the drive wheel 36 is a short shaft 39 provided with the belt pulley 40 and with the small friction pulley 42. The bearings for all of these shafts except the shaft 37 are provided in the base castings arranged upon the beams 3 and 4. In the box 38 I arrange the sleeve 43 in which the end of the shaft 37 is eccentrically journaled. This sleeve is provided with the lever 44 from which the connection 45 extends to a treadle beneath the feed table 46. The pulley 40 is driven in the same direction and from the same shaft as that numbered 27, so that the friction pulley 42 revolves in an opposite direction from the pulley 35. On the shaft 37 I provide the sprocket wheel 46 over which the sprocket chain 47 passes to sprocket wheels 48 upon the carrying rolls 7 and 8. The chain from thence is carried up over the idler sprocket 49 and then down over the sprockets 50 provided on the shafts of the carrying rolls 9 and 10. The belt passes from thence up over the tension sprocket 51, which is mounted upon the arm 52 arranged on the shaft 53, having bearings in the wrought iron bars 54 and 55, making up the upper part of the frame work. On the shaft 53 is a lever 56 adapted to engage the ratchet quadrant 57 by which the lever, after being adjusted to raise or lower the sprocket 51, is held.

It will be seen that by moving the lever 44 the drive friction pulley 36 may be moved into engagement with the pulley 35, whereupon the carrying rolls will be revolved so as to carry a slab from the feed table into the saws. An opposite movement of the lever will shift the pulley 36 against the pulley 42, whereupon the movement of the carrying rolls will be reversed immediately pulling the slab away from the saws. The reversal of the machine is under the control of the person feeding the machine.

Upon the feed board I arrange the spring guide 58 normally held up by springs 59 and which will be depressed when an extra wide slab is placed upon the table. This guide is ordinarily used only where a slab has a sawed edge which may be placed against it. Upon the opposite side of the machine I provide the bar 60 corresponding to the bar 54 and supported by the upright arms or standards 61 bolted thereto, and to the base piece 22, which part is provided with the lugs or ribs 63 to more effectually prevent movement of the standards. These standards and the standards 64 similarly arranged on the opposite side of the machine and supporting the bars 54 and 55, are preferably made of wrought iron and their upper ends are bent inwardly, as shown in Fig. 4 to narrow the upper frame work. The strong braces or cast iron beams 65 and 66 extend across between the bars 54 and 60 and are bolted firmly thereto.

67 and 68 represent round bars secured between the sides of this frame work and thereon are journaled the several drops 69 made of solid cast iron and with surfaces that work close together leaving practically no spaces between them in which slivers might lodge. These drops, as shown more clearly in Figs. 1 and 3, have the long shanks 70 which are journaled on the rods 68 and 67, and the quadrant or segment ends 71 each provided with the ribs 72 adapted to work in the notch 72' provided in the cross bars 65 and 66. The projecting upper ends 73 serve as stops and normally rest upon the tops of the parts 65 and 66. In the lower side of each of these heavy drops is a circular notch 74 in which is a spur idler 75 journaled therein on the shank of the counter-sunk screw 76, a detail of which is shown in Fig. 6. The face of one of these wheels, as shown, thus comes flush with the adjoining face of the next drop and only a small portion of the lower side of each spur wheel projects from the under side of the drop. The advantage of this construction is that the wheels are held so firmly upon the broad flat bearing of the notch 74 that they cannot wabble in their places and become worn.

In use the machine is started up with the drive wheel 36 resting upon the friction pulley 35. The saws revolve continuously. A slab is then placed upon the table and pushed upon the first feed or carrying roll, the sharp points of which take firm hold thereon. The slab is then carried under the first set of drops which severally raise to accommodate themselves to the varying thicknesses of the several parts of the slab. The weight of the drops is so great as to firmly hold the slab in place upon the carrying rolls and project the same into the saws. Passing from the saws the slab is taken up by the second bar of the carrying rolls and the forward end thereof being held down by the heavy drops of the rear part of the machine the several pieces of the slab are prevented from becoming displaced between the saws, or from flying to one side in case such a displacement should happen. In case of the saws sticking in a large knot or unusually wet slab, the operator presses down the treadle with his foot, thereby throwing the drive wheel 36 upon the reverse pulley 44 and thus reverse the direction of the movement of the carrying rolls so that the slab will be pushed back upon the table.

If it is desired to repair one of the spurs of the drops, the particular drop is simply raised and thrown back.

When it is desired to return a slab that has a large projecting knot which might otherwise catch upon the forward sides of the drops, the drops are raised and for this purpose I preferably provide the pull-rope 80 connected with each of the drops, or if desired a different rope may be provided for each drop.

Having thus described my invention, I claim as new and desire to secure by Letters Patent—

1. The combination with the base, of the spurred carrying rolls, with the saw arbor and the saws, means for driving the same, the bars 54 and 60, the cross bars 65 and 66 provided with guide notches, the rods 67 and 68, the standards 61 and 64 for supporting said bars, and the heavy drops 69 journaled on said rods and arranged close to one another, and the spurred wheels provided in the lower parts of said drops and above the carrying rolls, substantially as described.

2. The combination with the base, of the metal box frame arranged upon said base, the standards 61 and 64 projecting from said parts, the longitudinal bases 54 and 55 and 60 supported on said standards, the notched cross pieces 65 and 66, the rods 67 and 68, the closely arranged metal drops 69 pivoted on said rods provided with the curved ribs 72 guided in said notched cross pieces, each of said drops provided with a spur wheel projecting from the lower side thereof, the saw arbor and saws, the spurred carrying rolls having bearings in said metal box parts, a sprocket wheel provided upon the shaft of each roll, the sprocket 49 arranged upon the bar 55, an adjustable tension sprocket 51, a drive pulley on the saw arbor, the friction pulley 26 thereon, the large friction wheel 31 arranged upon the shaft 28, a friction pulley 35 on said shaft, an independently and oppositely driven shaft 39 provided with the friction pulley 42, the movable friction wheel 36, the shaft 37 thereof, a sprocket wheel on said shaft, and the sprocket belt extending over all of said sprocket wheels, substantially as and for the purpose specified.

In testimony whereof I have hereunto set my hand this 26th day of November, 1892.

HENRY JONCAS.

In presence of—
C. G. HAWLEY,
FRED. S. LYON.